(12) United States Patent
Colle et al.

(10) Patent No.: US 8,438,144 B2
(45) Date of Patent: May 7, 2013

(54) TRANSACTIONALLY CONSISTENT DATABASE REPLAY IN AN ENVIRONMENT WITH CONNECTION POOLING

(75) Inventors: Romain Colle, San Francisco, CA (US); Karl Dias, Foster City, CA (US); Leonidas Galanis, San Jose, CA (US); Supiti Buranawatanachoke, San Mateo, CA (US); Jonathan Giloni, Foster City, CA (US); Efstratios Papadomanolakis, San Francisco, CA (US); Yujun Wang, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 12/870,736

(22) Filed: Aug. 27, 2010

(65) Prior Publication Data

US 2012/0054245 A1 Mar. 1, 2012

(51) Int. Cl.
*G06F 17/30* (2006.01)
(52) U.S. Cl.
USPC .......................................................... 707/705
(58) Field of Classification Search .................... 707/705
See application file for complete search history.

(56) References Cited

U.S. PATENT DOCUMENTS

| | | | |
|---|---|---|---|
| 6,253,228 B1 | 6/2001 | Ferris et al. | |
| 7,216,126 B2 | 5/2007 | Choy | |
| 7,685,194 B2 | 3/2010 | Kabra et al. | |
| 7,685,437 B2 | 3/2010 | Hacigumus et al. | |
| 2002/0152188 A1 | 10/2002 | Crus et al. | |
| 2003/0093499 A1* | 5/2003 | Messinger et al. | 709/219 |
| 2003/0172091 A1 | 9/2003 | Norcott | |
| 2004/0015600 A1 | 1/2004 | Tiwary et al. | |
| 2004/0221115 A1* | 11/2004 | Sahin et al. | 711/154 |
| 2005/0172029 A1* | 8/2005 | Burke et al. | 709/232 |
| 2006/0248119 A1 | 11/2006 | Staneve et al. | |
| 2008/0097961 A1 | 4/2008 | Dias et al. | |
| 2008/0097995 A1 | 4/2008 | Dias et al. | |
| 2008/0097996 A1 | 4/2008 | Dias et al. | |
| 2008/0098003 A1 | 4/2008 | Dias et al. | |
| 2008/0263006 A1 | 10/2008 | Wolber et al. | |
| 2009/0106219 A1 | 4/2009 | Belknap et al. | |
| 2009/0106321 A1 | 4/2009 | Dias et al. | |
| 2011/0276550 A1 | 11/2011 | Colle et al. | |

OTHER PUBLICATIONS

Romain Colle, et al., "Oracle Database Replay" Proceedings of the VLDB Endowment, vol. 2, Issue 2, Aug. 2009, pp. 1542-1545.
Leonidas, Galanis, et al., "Oracle Database Replay" SIGMOD, 2008, pp. 1159-1170.
Galanis, L. et al., "Oracle Database Replay," Dated 2008 (12 pages), Jun. 12, 2008.

(Continued)

*Primary Examiner* — Thu-Nguyet Le
(74) *Attorney, Agent, or Firm* — Hickman Palermo Truong Becker Bingham Wong LLP

(57) ABSTRACT

A method, apparatus, and computer-readable medium is provided for replaying captured workload data in a database environment with connection pools. A replay system includes a dispatcher that manages a connection pool. In one aspect, the dispatcher selects available connections for sending database commands that are ready to be executed against a database, but prevents from being sent, or holds, commands that are not ready to be executed against the database. Commands may be stored at the dispatcher until the database advances to a state that allows the commands to be executed. In another aspect, the dispatcher may use an available connection to send a command to a database instance even though the command is not ready to be executed, as long as at least a threshold number or percentage of connections remains available.

32 Claims, 4 Drawing Sheets

OTHER PUBLICATIONS

Johal, I., "Oracle 11g Database Replay", Dated 2007 (38 pages).
Wang, Y. et al., "Real Application Testing with Database Replay" Dated 2009. (6 pages), Jun. 29, 2009.

U.S. Appl. No. 12/775,322, filed May 6, 2010, Notice of Allowance, Aug. 3, 2012.

* cited by examiner

FIG. 2

| CLIENT 1 | CLIENT 2 | CLIENT 3 | WAIT-FOR SCN | COMMIT SCN |
|---|---|---|---|---|
| UPDATE T1 | | | 3 | |
| | READ T1 | | 5 | |
| COMMIT | | | 10 | 11 |
| | READ T1 | | 12 | |
| | | READ T2 | 12 | |
| | | UPDATE T2 | 14 | |
| | | COMMIT | 21 | 22 |
| READ T1 | | | 24 | |
| | READ T1 | | 30 | |

TRANSACTIONALLY CONSISTENT DATABASE REPLAY IN AN ENVIRONMENT WITH CONNECTION POOLING

CROSS-REFERENCE TO RELATED APPLICATIONS

This application is related to: (1) U.S. Pat. App. No. 60/853,271, entitled "Database Workload Capture And Replay Architecture," filed Oct. 20, 2006, the entire contents of which is hereby incorporated by reference as if fully set forth herein; (2) U.S. patent application Ser. No. 11/800,122, entitled "Database Workload Capture And Replay Architecture," filed May 3, 2007, the entire contents of which is hereby incorporated by reference as if fully set forth herein; (3) U.S. patent application Ser. No. 11/800,240, entitled "Database Workload Replay Remapping Infrastructure," filed May 3, 2007, the entire contents of which is hereby incorporated by reference as if fully set forth herein; (4) U.S. patent application Ser. No. 11/800,238, entitled "Transactionally Consistent Database Workload Replay," filed May 3, 2007, the entire contents of which is hereby incorporated by reference as if fully set forth herein; (5) U.S. patent application Ser. No. 11/800,224, entitled "Client-Driven Functionally Equivalent Database Replay," filed May 3, 2007, the entire contents of which is hereby incorporated by reference as if fully set forth herein; (6) U.S. patent application Ser. No. 11/800,239, entitled "Capturing Database Workload While Preserving Original Tranactional And Concurrency Characteristics For Replay," filed May 3, 2007, the entire contents of which is hereby incorporated by reference as if fully set forth herein; (7) U.S. patent application Ser. No. 12/775,322, entitled "Fine Grain Synnronization For Database Replay," filed May 6, 2010, the entire contents of which is hereby incorporated by reference as if fully set forth herein. The applicant(s) hereby rescind any disclaimer of claim scope in the related application(s) or the prosecution history thereof and advise the USPTO that the claims in this application may be broader in some respects than any claim in the related application(s). Collectively, these seven related applications are referred to as the "Workload Capture and Replay" applications.

FIELD OF THE INVENTION

The present invention relates to capturing a workload in one database system and replaying that workload in another database system that utilizes connection pools.

BACKGROUND

Database Systems

A database management system ("DBMS") manages a database. A database management system may comprise one or more database instances. A database comprises database data and metadata that is stored on a persistent memory mechanism, such as a set of hard disks. Metadata defines or describes database objects.

Database applications and clients interact, directly or indirectly, with database instances by submitting database commands that cause the database instances to perform operations on data stored in a database by executing the commands against the database. A database command may be in the form of a database statement that conforms to a database language. One example language for expressing database requests is the Structured Query Language (SQL). There are many different versions of SQL. Some versions are standard, and some are proprietary. There are also a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not limited to any particular version of SQL or to any particular form of database command.

Connection Pools

A dispatcher manages database connections to database instances and uses the database connections to distribute work to the database instances. The dispatcher loans database connections to clients and applications requesting to execute database commands against a database. In one example, the dispatcher selects an available database connection to a database instance for processing a request from a client or application, and the dispatcher sends database commands from the client or application on the database connection to the database instance for execution against the database. The database instance receives the database commands, processes the database commands against the database, and, optionally, returns results to the client or application. The dispatcher may be implemented on the database server to provide connections to instances of the database server, or at a middle-tier server between the database server and the client or application.

A connection pool is a set of database connections managed by a dispatcher. A database connection selected by a dispatcher is one of multiple connections to multiple database instances that are maintained in the connection pool. The database connection may refer to a physical mechanism, such as a physical port, a logical configuration, or both. Often, there is a one-to-one mapping of logical connections (i.e., database sessions) to physical connections; however, there may be more than one logical connection associated with a single physical connection. In one example, the free connections in the connection pool include only those connections that are not allocated to clients for processing requests for the mid-tier. As work completes, connections are returned to the connection pool and are available for clients of subsequent requests to borrow from the pool.

Testing and Validating a Database System

Large business-critical applications are complex and experience highly varying load and usage patterns. These applications are expected to provide certain service guarantees in terms of response time, throughput, uptime, and availability. At times, it may be desirable to change a system that includes such applications. Such a change might involve upgrading the system's database server code or modifying a configuration, for example. However, before any change is made to a production system, extensive testing and validation should be performed in a test system. In order to be confident that a change will not cause problems (e.g., errors or performance issues) in the production system once that change is introduced into the production system, a system tester exposes the test system to a workload that simulates the workload of the production system in a real world environment.

Other approaches have not been able to adequately or efficiently replicate a real production workload in a test system that utilizes connection pools. Under one approach, human users are asked to use the test system as though the test system were a production system. However, this approach is random, non-deterministic, and inefficient. This approach often fails to reproduce the load patterns that would be experienced in an actual production environment.

Database Workload Capture and Replay

Under a Database Workload Capture and Replay architecture developed by Oracle, Inc., as described in the Workload Capture and Replay applications that have been incorporated by reference herein, a production workload is captured and processed at a test database system in the same commit order that the production database system originally processed the workload. According to an alternate implementation also developed by Oracle, Inc., the test database system is exposed to a workload in a manner that, while not strictly tied to the same commit ordering, preserves dependencies that arise from the modification of database objects by the workload.

Current workload replay systems do not account for connection pooling in the replay environment. Whether or not the commit ordering of the workload is strictly enforced by one or more database instances in a database replay system, the use of connection pools in such database replay systems may create a deadlock. For example, a deadlock may occur when all available database connections are allocated to process database commands that depend from other database commands that have not been sent to the database instances. Even if a deadlock does not occur, replay may be significantly delayed if a majority of the database connections are tied up by database commands that depend from other database commands that have not yet been sent to the database instances. These problems are magnified in a system where multiple dispatchers use multiple connection pools to send different commands to potentially different database instances.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a table that represents information captured from a workload, according to an embodiment described herein.

DETAILED DESCRIPTION

Figure 1:
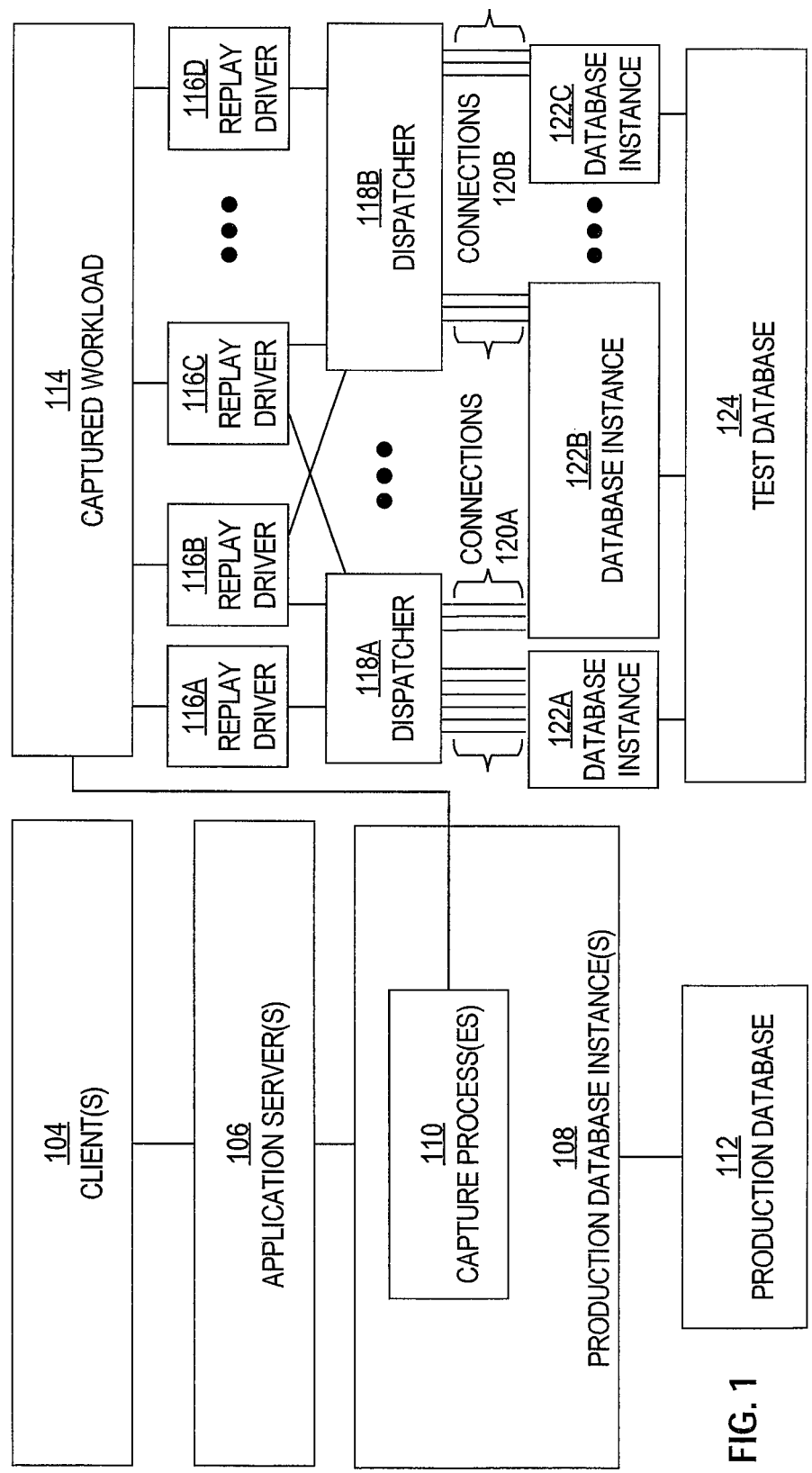
FIG. 1 is a block diagram that shows an example of a system in which a captured workload is replayed against a test database using multiple connection pools, according to an embodiment described herein.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for replaying captured workload data in a database system that utilizes connection pools. The techniques described herein may be implemented by specially configuring one or more computing devices to perform the techniques. In one embodiment, sequences of instructions for performing the techniques may be stored on one or more non-transitory computer-readable storage media. The techniques may be accomplished when the stored instructions are executed by one or more computing devices.

In one embodiment, a replay database system includes a dispatcher that manages a set of connections to a set of database instances (i.e., a connection pool). The dispatcher selects available connections for sending database commands to database instances. In one embodiment, the dispatcher uses an available database connection to send a command to a database instance only when the command is ready to be executed. In other words, the dispatcher prevents from being sent, or holds, commands that are not ready to be executed. In one embodiment, the dispatcher uses any available database connections to send database commands that are ready to be executed by the database instances.

In one embodiment, the dispatcher uses an available database connection to send a command to a database instance even though the command is not ready to be executed, as long as at least one database connection remains available. For example, the dispatcher may allow up to a specified percentage or specified number of database connections to be used by commands that are not ready to be executed. If the specified percentage or specified number of database connections is already in use, then the dispatcher holds those database commands that are not ready to be executed.

In one embodiment, the dispatcher determines whether a database command is ready to be sent based on captured workload information and replay database state information. The captured workload information indicates a logical time or actual time in which the captured database command was previously executed in a production database system. For example, the captured workload information may indicate a state of the production database that existed when the database command was previously executed. The replay database state information indicates a logical time or actual time of a replay database system as it replays database commands. For example, the replay database state information may indicate a state of the replay database that currently exists or last existed as database commands are being replayed in the replay database system.

In one embodiment, if the database command is associated with a captured database state that is on or before the current replay database state, then the database command is ready for execution against the database. Commands that are ready for execution may be sent on available database connections to available database instances. In another embodiment, if the database command is associated with a captured database state that is after the current replay database state, then the database command is not ready for execution against the database. If the dispatcher receives a database command that is not ready to be executed against a database, then the database command may be stored at the dispatcher until the database advances to a state that allows the database command to be executed. In one embodiment, the dispatcher determines that there are at least a threshold number or percentage of database connections available and, in response, uses an available database connection to send the database command even though the database command is not ready for execution against the database.

In one embodiment, database commands are held by the dispatcher until the database advances to a state such that the database commands are ready to be sent. For example, a database command associated with a logical time of 12 may be sent once the database advances to a logical time of 12 or later. In another embodiment, held database commands may be sent by the dispatcher on available database connections once at least a threshold number or percentage of database connections become available. In one example, the threshold number is one. In this example, a database command that is not ready for execution will be held by the dispatcher if only one database connection is available. Once a second database connection becomes available, the held database command may be sent on either of two available database connections.

Capturing Workload

A workload capture and replay architecture is described in the Workload Capture and Replay applications, which have been incorporated by reference herein. These applications describe techniques for capturing a workload of a production system, processing the workload to prepare the workload for replay, replaying the workload on a test system, and monitoring the performance of the test system. The captured workload may include information about the initial state of the production database and information that describes a set of calls or database commands made against the production database. As changes are committed against the production database, the production database advances to new states of transactional consistency. In one embodiment, the captured workload includes transactional data such as System Change Numbers (SCNs) that describe relative times at which the database commands in the workload were received, executed, and/or committed against the production database. The initial state of the database, and the set of issued commands and their associated SCNs define the state of the database against which any given captured database command was executed.

FIG. 1 is a block diagram that shows an example of a system in which workload that is submitted to a production database server is captured and replayed to a test database server. The example shown includes clients 104 that send requests to application servers 106. Clients 104 may be separate computers or separate processes that execute on the same computer. For example, in one embodiment, clients 104 are Internet browsers (e.g., Mozilla Firefox) that execute on separate computers that are communicatively coupled to the Internet. In one embodiment, clients 104 send requests to, and receive responses from, application servers 106 over the Internet.

Application servers 106 may be separate computers or separate processes that execute on the same computer. For example, in one embodiment, application servers 106 are web server-invoked processes that execute on separate servers that are communicatively coupled to the Internet. In one embodiment, application servers 106 receive requests from, and send responses to, clients 104 over the Internet. Each of application servers 106 may implement different functionality for responding to different types of requests from clients 104.

In servicing requests from clients 104, application servers 106 might retrieve data from and/or store data to production database 112. To accomplish this, in one embodiment, application servers 106 establish database sessions with production database instance(s) 108. Within these sessions, application servers 106 send database commands to production database instance(s) 108. Such database commands may include Structured Query Language (SQL) select statements, for example.

Application servers 106 send database commands to production database instance(s) 108 on behalf of clients 104. In the illustrated example, there are multiple application servers 106 connected to one or more than one production database instance(s) 108. In other examples not illustrated, the clients may be connected directly to production database instance(s) 108. In other words, application servers 106 are not required in order to send commands to database instance(s) 108. In yet another example, the clients 104 and/or application servers 106 are connected to a dispatcher in the production database system. The dispatcher manages a connection pool of database connections to production database instance(s) 108.

Production database instance(s) 108 receive database commands and execute the database commands relative to production database 112. As a result of the executing the database commands, production database instance(s) 108 may store data in, and/or retrieve data from, production database 112. Production database instance(s) 108 may execute two or more database commands in a transactional manner, so that none of the effects of the database commands in a single transaction are made permanent in production database 112 unless all of the effects of those database commands can be made permanent. Production database instance(s) 108 may return, to application servers 106, data retrieved from production database 112 as a result of the execution of certain database commands (e.g., SQL select statements). Applications servers 106 may use such retrieved data in forming responses to clients 104.

In one embodiment, production database instance(s) 108 include capture processes 110. Capture processes 110 may be implemented as separate concurrently executing processes or as concurrently executing threads of the same process, for example. In one embodiment, capture processes 110 collectively, transparently, and non-intrusively capture all workload that production database instance(s) 108 receive from external entities (e.g., application servers 106 and/or clients 104). In another embodiment, capture processes 110 capture workload from a subset of clients 104 and/or application servers 106 and filter out workload from other clients 104 and/or application servers 106.

As used herein, the term "workload" refers to discrete, independently meaningful units called "workload units". In one embodiment, each "workload unit" corresponds to a separate "user request" (e.g., a request originating from (a) one of clients 104, (b) one of application servers 106, or (c) some other process that sends database commands to production database instance(s) 108). In one example, the workload includes (a) information that describes one or more database commands requested to be executed by production database instance(s) 108, and (b) one or more database state values that represents a logical database state in which the one or more database commands should be executed.

As changes are committed to production database 112, the state of production database 112 advances in logical increments of time that reflect states of transactional consistency. In one embodiment, capture processes 110 capture, for captured database commands, the state values that reflect the states of transactional consistency in which the database commands were received, executed, and/or committed against production database 112. For a given command, the captured state value may be used to determine which changes had been committed to production database 112 before the given command.

In one embodiment, the information that describes one or more commands includes the actual text of the command, such as the SQL text of a SQL command. Alternately, the information that describes one or more commands may include command identifiers that identify one or more commands or one or more parts of the one or more commands. Optionally, the information that describes the commands may be stored in a binary or compressed format. The information that describes the commands may be stored in any format in any manner, and the commands may be used by a test database system to replay the commands that were originally executed on the production database system. In one embodiment, the commands stored in the captured workload require further processing in order to prepare the commands to be replayed on the test database system.

Capture processes 110 store and record the production workload as captured workload 114. As a result, captured workload 114 may comprise workload that was captured during a specified interval of time, referred to herein as the "recording interval". In one embodiment, captured workload 114 represents actual real-world use of production database instance(s) 108, which use is not specifically for any testing purpose.

In one embodiment, capture processes 110 initially write captured workload to in-memory buffers. Data stored in these in-memory buffers is compressed and written out in batches to persistent storage. Because an I/O transaction involving persistent storage does not need to be performed after the capture of every individual workload unit, the impact of the workload capture on the performance of production database instance(s) 108 is reduced.

Processing and Replaying Captured Workload

Captured workload 114 includes information that describes database commands and state values that represent states of the production database in which the database commands were executed. The captured workload may be processed prior to replay in order to optimize or prepare the captured workload for efficient and accurate replay. For example, values such as row IDs or absolute times that are tied to the production database system may be mapped to values that are correct for the test database system. Each of replay drivers 116A-D emulates one or more clients 104 by replicating the captured workload 114 in a test database system. In one embodiment, replay drivers 116A-D send database commands to dispatchers 118A-B at the same relative time in which the database commands were sent by clients 104 in the production environment.

In one embodiment, a wait-for state value is stored in association with each of a set of database commands in the captured workload. In one example, the wait-for state value for a given command represents the state of the production database in which the given command was executed. In other words, the wait-for state value may be the same or approximately the same as a commit state value of a latest command that was committed to change the production database before the given command. In various embodiments, the wait-for state value may be affected by background processes that were executed after the latest command that was committed to change the production database. In one embodiment, the wait-for state is a wait for SCN that is captured with the database command. The wait-for state for a database command may be sent by a replay driver along with the database command or otherwise associated with the database command.

Dispatching Database Commands

Each of dispatchers 118A-B manages a connection pool. Example dispatcher 118A receives a request from one of replay drivers 116A-C and selects an available connection from connections 120A on which to send the request to one of database instances 122A-B for processing against a test database 124. Similarly, example dispatcher 118B receives requests from one or replay drivers 116B-D and selects an available connection from connections 120B on which to send the request to one of database instances 122B-C.

In one embodiment, dispatchers 118A-B receive wait-for states associated with database commands to be sent to database instances 122A-C. Optionally, dispatchers 118A-B sort or otherwise organize received database commands according to their respective wait-for states. In one example, the received database commands are stored in a priority queue ordered according to wait-for state.

Maintaining an ordered queue of database commands may be resource intensive. In another embodiment, the received database commands are organized as a heap (also called priority queue). A heap has the property that, even though it is not completely sorted, the minimum element in the heap may be retrieved fairly quickly. In one example, insertion in the heap may be performed in $O(\log(n))$, and get_minimum is also performed in $O(\log(n))$, where n is the number of items in the heap. The heap may be organized as a tree structure by representing received database commands as child nodes of other received database commands that are associated with earlier database states. In this manner, database commands with earlier database states are more likely to be represented near the top of the tree.

In one embodiment, a dispatcher waits to send a given database command until test database 124 advances to a state that is on or after a wait-for state associated with the given database command. In other words, based on the wait-for state stored for a given database command, the dispatcher waits to send the given database command until the test database has reached the wait-for state for the given database command. In this manner, other received database commands that are after the given database command may also be held by the dispatcher until the database advances to states that are on or after wait-for states associated with the other database commands.

In one embodiment, a dispatcher waits to send the given database command until either (a) the test database has reached the wait-for state for the given database command or (b) at least a threshold percentage or number of database connections are available to send the given database command. According to this other embodiment, dispatchers may send database commands to database instances even though the database commands are not ready to be executed by the database instances. These database commands sent to the database instances are held by the database instances until the test database advances to a later state against which the database commands are ready to be executed.

In one example, commands held or kept in waiting by the dispatcher are stored in a queue with a priority for earlier database commands such that the next, first, or minimum command in the queue is the next command to be sent on an available database connection to a database instance. In one embodiment, in response to determining that the database under replay has reached the wait-for state for the next command, the next command is sent on an available database connection to a database instance. In another embodiment, the next command is sent in response to determining that over a threshold number or percentage of database connections are available, regardless of the state of the database under replay. The dispatcher waits to send commands until either (a) the database under replay has reached the wait-for state of the next command to be sent, or new database connections become available such that at least a threshold number or percentage of connections will remain available even if the next command is sent.

In one embodiment, the dispatcher receives a command that is ready for execution. If the dispatcher currently only has blocked calls that are held in the queue, then the unblocked command will be at the front of the queue since its wait-for state is lower than all of the blocked calls. Accordingly, the dispatcher gives the unblocked database command a database connection if one is available. If no connection is available, then the unblocked database command remains next in the queue to utilize a connection once the connection becomes available.

FIG. 2 shows an example listing of captured database commands and their associated wait-for SCNs and commit SCNs. As shown, database commands are received from three clients in the production system. The first client sends UPDATE T1 with a wait-for SCN of 3, COMMIT with a wait-for SCN of 10 and a commit SCN of 11, and READ T1 with a wait-for SCN of 24. The second client sends READ T1 with a wait-for SCN of 5, READ T1 with a wait-for SCN of 12, and READ T1 with a wait-for SCN of 30. The third client sends READ T2 with a wait-for SCN of 12, UPDATE T2 with a wait-for SCN of 14, and COMMIT with a wait-for SCN of 21 and a commit SCN of 22. The commands and state values associated with the commands are captured by capture processes in the production system.

Figure 3:
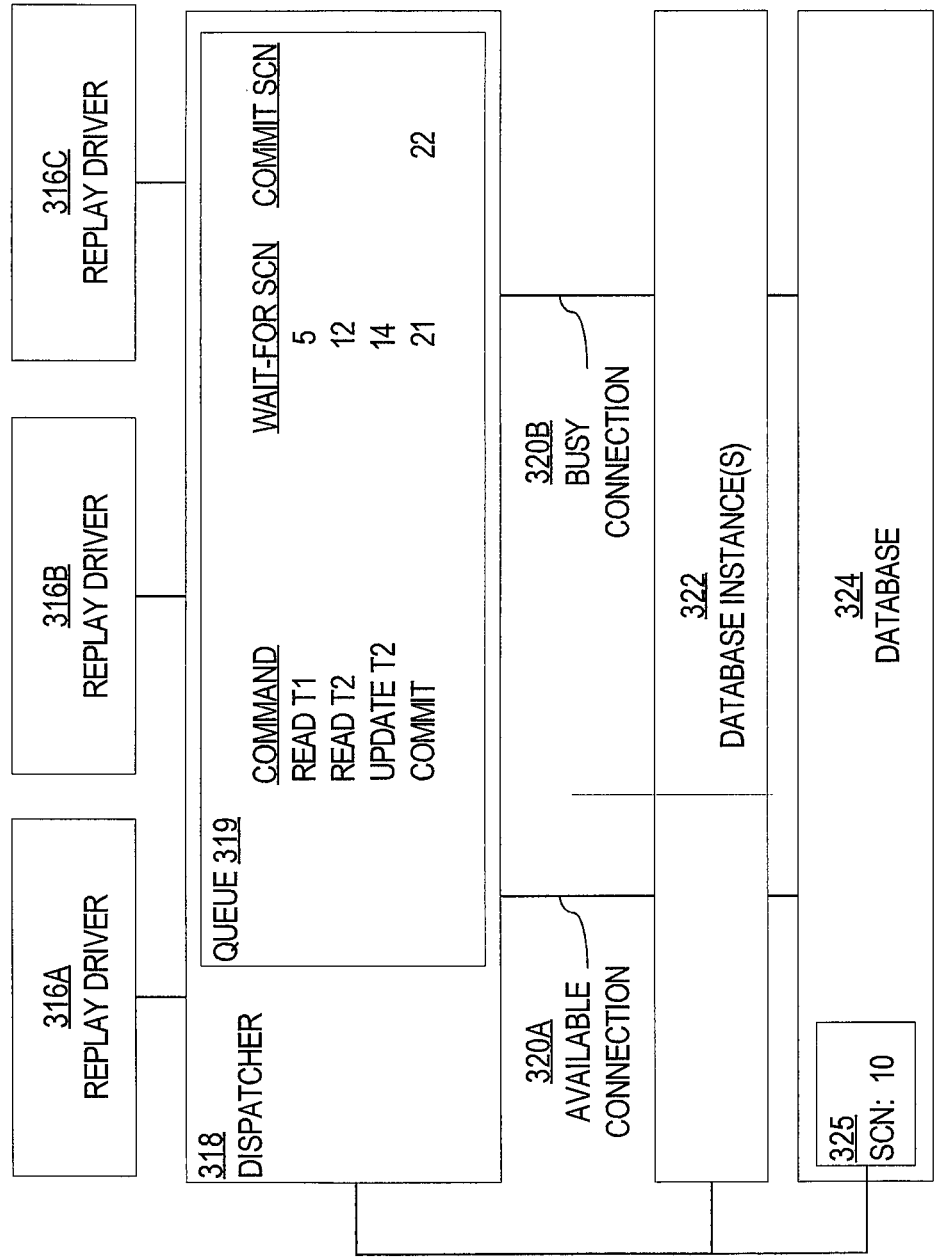
FIG. 3 shows an example dispatcher storing a queue of commands to be executed against a database, according to an embodiment described herein.

FIG. 3 shows an example dispatcher holding commands to be executed against a database. Replay drivers 316A-C send database commands to dispatcher 318, which stores received database commands in queue 319. As illustrated, the dispatcher has received but not sent four commands: READ T1 with a wait-for SCN of 5, READ T2 with a wait-for SCN of 12, UPDATE T2 with a wait-for SCN of 14, and COMMIT with a wait-for SCN of 21 and a commit SCN of 22.

Dispatcher 318 manages two connections 320A-B. One connection 320B is busy, down, or otherwise unavailable. The other connection 320A is an available connection to a database instance of database instance(s) 322. As shown, database 324 is in a state 325 represented by the state value of 10. As shown, dispatcher 318 may send a first command, READ T1, with a wait-for SCN of 5 because the wait-for SCN of 5 is less than the current SCN of 10 in database 324 under replay. Once the first command is processed by the database instance, database connection 320A returns to being available. After the first command is sent, even after the first database connection returns to being available, dispatcher 318 waits until database 324 advances to a state 325 that is on or after 12, which is the next wait-for SCN in queue 319. Accordingly, dispatcher 318 prevents the remaining commands in queue 319 from being sent on available database connection 320A.

As shown, dispatcher 318 has not yet received a command that will advance the state 325 of database 324 under replay beyond the current state value of 10. In one embodiment now illustrated, other dispatchers send commands to database instances that advance database 324 beyond the current state value of 10. In response to detecting that database 324 has advanced to a state value of 12 or greater, dispatcher 318 sends a second database command, READ T2, with a wait-for SCN of 12.

In another embodiment, dispatcher 318 receives a COMMIT command from replay driver 316A, associated with CLIENT 1 from FIG. 2. The COMMIT command has a wait-for SCN of 10 and a commit SCN of 11. In response to determining that the current database state 325 has reached the wait-for SCN of the received command, the received command is sent on available connection 320A to a database instance of database instance(s) 322. The database instance executes the COMMIT command against database 324, causing database 324 to change in state from 10 to 11. Thereafter, commands with wait-for SCNs of 11 or later may be processed against database 324.

In one embodiment, a threshold of at least one database connection is specified to remain available. In response to detecting that database connection 320B becomes available, totaling more than one available database connection 320A-B, dispatcher 318 may send next database commands to database 324 even if the next database commands are not ready to be executed by database 324. For a connection pool of size N, the threshold may be any specified number of database connections from one to N-1. For example, a threshold of 900 database connections may be specified for a dispatcher that manages 1000 database connections. In other words, if 899 connections are available, then the dispatcher will not send commands that are not ready to be executed against the database. If 901 connections are available, then the dispatcher will allow an available connection to be used to process a command even though the command is not ready to be executed against the database.

In another embodiment, a threshold percentage of database connections are specified to remain available. In response to detecting that database connection 320B becomes available, totaling 100% of database connections 320A-B, dispatcher 318 may send next database commands to database 324 even if the next database commands are not ready to be executed by database 324. The threshold percentage may be any specified percentage of database connections greater than 0% and less than 100%. For example, a threshold percentage of 90% of database connections may be specified for the dispatcher that manages 1000 database connections.

Executing Captured Workload

Database processes in database instances 122A-C receive requests from dispatchers 118A-B and process the requests against test (i.e. "replay") database 124. Before executing a received command, the receiving database process in instances 122A-C determines whether the wait-for state of the command has been satisfied by the current replay database state. If the current database state has not yet reached the wait-for state, the process blocks the command (i.e. waits) until the process is informed that the database has reached the wait-for state from which the command depends.

In one embodiment, database instances 122A-C receive information describing a logical database state in which a given command was executed in the production environment. Database instances 122A-C monitor a current replay database state of test database 124. The database instances wait to replay the given command until the current replay database state reaches the logical database state in which the given command was executed in the production environment. If the given command is not ready to be executed against test database 124, database instances 122A-C execute other commands to advance the replay database state to the logical database state in which the given command was executed in the production environment. Once test database 124 reaches a replay database state that is on or after the logical database state in which the given command was executed in the production environment, database instances 122A-C execute the given command against test database 124. In this manner, dependencies based on the wait-for states of the commands are enforced by the database instances as well as the dispatcher that sends database commands to the database instances.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
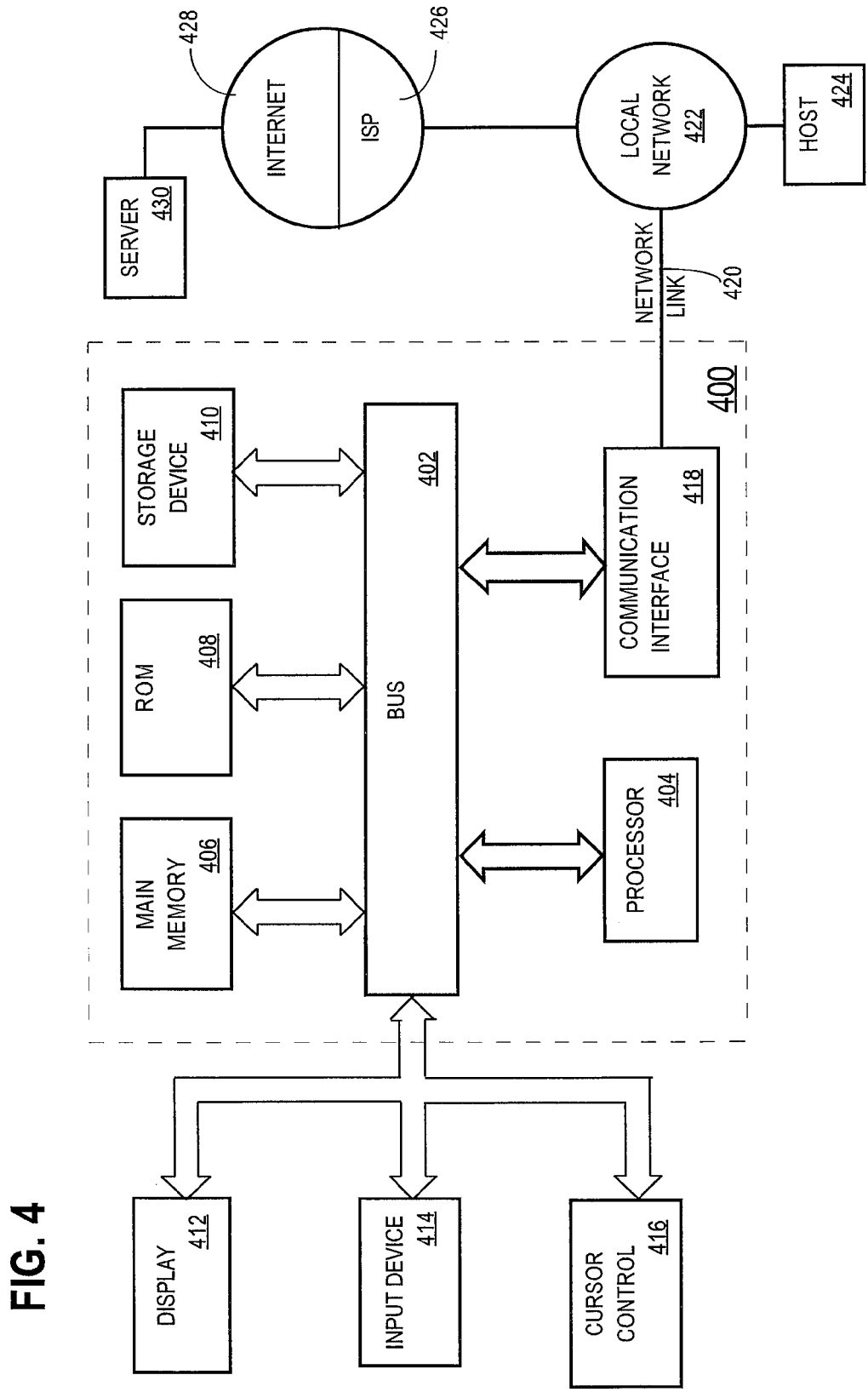
FIG. 4 is a block diagram that illustrates a computer system upon which an embodiment described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine.

According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for replaying captured workload data against a database by sending database commands from the captured workload data on a set of database connections to a set of database instances, the method comprising:
    while replaying the captured workload data against the database:
        while the database is on or after one or more first database states but before one or more second database states, keeping at least one database connection of the set of database connections available for executing one or more first database commands that are associated with one or more database states that are on or after the one or more first database states but before the one or more second database states by preventing one or more second database commands from using the at least one database connection without preventing the one or more second database commands from using one or more other database connections, wherein the one or more second database commands are associated with one or more database states that are on or after the one or more second database states; and
        detecting that the database is on or after the one or more second database states, and, in response to detecting that the database is on or after the one or more second database states, using one or more available database connections to send at least one of the one or more second database commands without preventing the at least one of the one or more second database commands from using the at least one database connection;
    wherein the method is performed by one or more computing devices.

2. The method of claim 1, wherein keeping at least one connection of the set of database connections available while the database is on or after the one or more first database states but before the one or more second database states comprises:
    receiving a particular database command that is associated with a particular database state that is on or after the one or more first database states but before the one or more second database states; and
    allowing the particular database command to be sent on a particular database connection of the at least one available database connection;
    wherein the particular database connection returns to being available after the particular database command is sent on the particular database connection and executed by a database instance.

3. The method of claim 1, wherein the database is a test database, wherein the captured workload data comprises a plurality of database commands and a plurality of captured state values that are received from a plurality of replay drivers emulating clients that previously submitted the plurality of database commands for execution against a production database; wherein each captured state value specifies, for a database command of the plurality of database commands, a logical database state in which the database command was previously executed against the production database; and wherein the plurality of database commands includes the one or more second database commands that are prevented from using the at least one database connection.

4. The method of claim 1, wherein the captured workload data comprises a plurality of database commands and a plurality of captured system change numbers; wherein each captured system change number specifies, for a database command of the plurality of database commands, a logical database state for which the database command is to wait; wherein the database advances in logical database states as changes are committed to the database by a plurality of database instances that includes the set of database instances; and
    wherein the plurality of database commands includes the one or more second database commands that are prevented from using the at least one database connection.

5. The method of claim 1, wherein the set of database connections is a first set of database connections; wherein sending database commands on the first set of database connections is performed by a first dispatcher that manages the first set of database connections, and wherein the database advances from the one or more first database states to the one or more second database states as a result of execution of a database command sent by a second dispatcher on a database connection of a second set of database connections.

6. The method of claim 1, wherein keeping at least one database connection available by preventing one or more second database commands from using the at least one database connection comprises sending a particular database command on an available database connection of the set of database connections in response to determining that at least a threshold number of database connections in the set of database connections are available, wherein the threshold number is greater than zero and fewer than a total number of database connections in the set of database connections; wherein the particular database command is associated with a particular database state that is on or after the one or more second database states; wherein at least one database connection remains available while the particular database command is sent; and wherein a database instance receiving the particular database command on the available database connection prevents the particular database command from being executed against the database until the database instance detects that the database is on or after the particular database state.

7. The method of claim 1, wherein keeping at least one database connection available by preventing one or more second database commands from using the at least one database connection comprises sending a particular database command on an available database connection of the set of database connections in response to determining that at least a threshold percentage of database connections in the set of database connections are available, wherein the threshold percentage is greater than zero and less than one-hundred;

wherein the particular database command is associated with a particular database state that is on or after the one or more second database states, wherein at least one database connection remains available while the particular database command is sent, and wherein a database instance receiving the particular database command on the available database connection prevents the particular database command from being executed against the database until the database instance detects that the database is on or after the particular database state.

8. The method of claim 1, wherein a plurality of database commands comprising the one or more second database commands are stored in a queue, wherein each database command of the plurality of database commands is associated with a captured state value that represents a logical database state, and wherein the plurality of database commands is organized in the queue based on the captured state values.

9. The method of claim 1, wherein a plurality of database commands comprising the one or more second database commands are stored in a queue, wherein each database command of the plurality of database commands is associated with a captured state value that represents a logical database state, and wherein the plurality of database commands is organized in the queue based on the captured state values; wherein the one or more database commands include a particular database command associated with a particular captured state value, the method further comprising:

determining that the particular captured state value is a next captured state value in the queue;

wherein keeping at least one connection of the set of database connections available while the database is in the one or more first database states comprises preventing the particular database command from using the at least one database connection.

10. A method for managing a set of database connections to replay captured workload data against a database by sending database commands to database instances for execution against the database, the method comprising:

receiving information that describes a plurality of database commands including a particular database command associated with a particular captured state value, wherein the particular captured state value represents a logical database state in which the particular database command should be executed;

detecting that the database is in one or more first database states that are before the logical database state in which the particular database command should be executed;

determining that the particular captured state value is before captured state values associated with other database commands of the plurality of database commands for which the information has been received, but in which the other database commands have not yet been sent for execution against the database;

while the database is in the one or more first database states, keeping at least one database connection of the set of database connections available by preventing the particular database command from being sent on the at least one database connection;

wherein a plurality of dispatchers sends database commands on a plurality of connections to a plurality of database instances, and wherein execution of one or more of the plurality of database commands by one or more of the plurality of database instances causes the database to change database states;

detecting that the database is in one or more second database states that are on or after the logical database state in which the particular database command should be executed, and, in response to detecting that the database is in the one or more second database states, using an available database connection of the set of database connections to send the particular database command;

wherein the method is performed by one or more computing devices.

11. The method of claim 10, wherein the particular database command is a second particular database command, wherein keeping the at least one database connection of the set of database connections available while the database is in the one or more first database states comprises:

receiving a first particular database command that is associated with a particular database state that is on or before the one or more first database states; and allowing the first particular database command to be sent on a particular database connection of the at least one database connection;

wherein the particular database connection returns to being available after the first particular database command is sent on the particular database connection and executed by a database instance.

12. The method of claim 10, wherein the database is a test database, and wherein the captured workload data was captured when commands were previously submitted for execution against a production database.

13. A non-transitory computer-readable storage medium storing one or more sequences of instructions which, when executed by one or more processors, causes the one or more processors to perform replaying captured workload data against a database by sending database commands from the captured workload data on a set of database connections to a set of database instances, wherein replaying the captured workload data against the database comprises:

while replaying the captured workload data against the database:

while the database is on or after one or more first database states but before one or more second database states, keeping at least one database connection of the set of database connections available for executing one or more first database commands that are associated with one or more database states that are on or after the one or more first database states but before the one or more second database states by preventing one or more second database commands from using the at least one database connection without preventing the one or more second database commands from using one or more other database connections, wherein the one or more second database commands are associated with one or more database states that are on or after the one or more second database states; and detecting that the database is on or after the one or more second database states, and, in response to detecting that the database is on or after the one or more second database states, using one or more available database connections to send at least one of the one or more second database commands without preventing the at least one of the one or more second database commands from using the at least one database connection.

14. A non-transitory computer-readable storage medium as recited in claim 13, wherein keeping at least one connection of the set of database connections available while the database is on or after the one or more first database states but before the one or more second database states comprises:
   receiving a particular database command that is associated with a particular database state that is on or after the one or more first database states but before the one or more second database states; and
   allowing the particular database command to be sent on a particular database connection of the at least one available database connection;
   wherein the particular database connection returns to being available after the particular database command is sent on the particular database connection and executed by a database instance.

15. A non-transitory computer-readable storage medium as recited in claim 13, wherein the database is a test database, wherein the captured workload data comprises a plurality of database commands and a plurality of captured state values that are received from a plurality of replay drivers emulating clients that previously submitted the plurality of database commands for execution against a production database; wherein each captured state value specifies, for a database command of the plurality of database commands, a logical database state in which the database command was previously executed against the production database; and wherein the plurality of database commands includes the one or more second database commands that are prevented from using the at least one database connection.

16. A non-transitory computer-readable storage medium as recited in claim 13, wherein the captured workload data comprises a plurality of database commands and a plurality of captured system change numbers; wherein each captured system change number specifies, for a database command of the plurality of database commands, a logical database state for which the database command is to wait; wherein the database advances in logical database states as changes are committed to the database by a plurality of database instances that includes the set of database instances; and wherein the plurality of database commands includes the one or more second database commands that are prevented from using the at least one database connection.

17. A non-transitory computer-readable storage medium as recited in claim 13, wherein the set of database connections is a first set of database connections; wherein sending database commands on the first set of database connections is performed by a first dispatcher that manages the first set of database connections, and wherein the database advances from the one or more first database states to the one or more second database states as a result of execution of a database command sent by a second dispatcher on a database connection of a second set of database connections.

18. A non-transitory computer-readable storage medium as recited in claim 13, wherein keeping at least one database connection available by preventing one or more second database commands from using the at least one database connection comprises sending a particular database command on an available database connection of the set of database connections in response to determining that at least a threshold number of database connections in the set of database connections are available, wherein the threshold number is greater than zero and fewer than a total number of database connections in the set of database connections; wherein the particular database command is associated with a particular database state that is on or after the one or more second database states; wherein at least one database connection remains available while the particular database command is sent; and wherein a database instance receiving the particular database command on the available database connection prevents the particular database command from being executed against the database until the database instance detects that the database is on or after the particular database state.

19. A non-transitory computer-readable storage medium as recited in claim 13, wherein keeping at least one database connection available by preventing one or more second database commands from using the at least one database connection comprises sending a particular database command on an available database connection of the set of database connections in response to determining that at least a threshold percentage of database connections in the set of database connections are available, wherein the threshold percentage is greater than zero and less than one-hundred; wherein the particular database command is associated with a particular database state that is on or after the one or more second database states, wherein at least one database connection remains available while the particular database command is sent, and wherein a database instance receiving the particular database command on the available database connection prevents the particular database command from being executed against the database until the database instance detects that the database is on or after the particular database state.

20. A non-transitory computer-readable storage medium as recited in claim 13, wherein a plurality of database commands comprising the one or more second database commands are stored in a queue, wherein each database command of the plurality of database commands is associated with a captured state value that represents a logical database state, and wherein the plurality of database commands are organized in the queue based on the captured state values.

21. A non-transitory computer-readable storage medium as recited in claim 13, wherein a plurality of database commands comprising the one or more database second commands are stored in a queue, wherein each database command of the plurality of database commands is associated with a captured state value that represents a logical database state, and wherein the plurality of database commands are organized in the queue based on the captured state values; wherein the one or more second database commands include a particular database command associated with a particular captured state value, and wherein the one or more sequences of instructions, when executed by the one or more processors, further cause:
   determining that the particular captured state value is a next captured state value in the queue;
   wherein keeping at least one connection of the set of database connections available while the database is in the one or more first database states comprises preventing the particular database command from using the at least one database connection.

22. A non-transitory computer-readable storage medium storing one or more sequences of instructions which, when executed by one or more processors, causes managing a set of database connections to replay captured workload data against a database by sending database commands to database instances for execution against the database, at least in part by:
   receiving information that describes a plurality of database commands including a particular database command associated with a particular captured state value, wherein the particular captured state value represents a logical database state in which the particular database command should be executed;

detecting that the database is in one or more first database states that are before the logical database state in which the particular database command should be executed;

determining that the particular captured state value is before captured state values associated with other database commands of the plurality of database commands for which the information has been received, but in which the other database commands have not yet been sent for execution against the database;

while the database is in the one or more first database states, keeping at least one database connection of the set of database connections available by preventing the particular database command from being sent on the at least one database connection;

wherein a plurality of dispatchers send database commands on a plurality of connections to a plurality of database instances, and wherein execution of one or more of the plurality of database commands by one or more of the plurality of database instances causes the database to change database states;

detecting that the database is in one or more second database states that are on or after the logical database state in which the particular database command should be executed, and, in response to detecting that the database is in the one or more second database states, using an available database connection of the set of database connections to send the particular database command.

23. The non-transitory computer-readable storage medium of claim 22, wherein the particular database command is a second particular database command, wherein the instructions, when executed, cause keeping the at least one database connection of the set of database connections available while the database is in the one or more first database states at least in part by:

receiving a first particular database command that is associated with a particular database state that is on or before the one or more first database states; and allowing the first particular database command to be sent on a particular database connection of the at least one database connection;

wherein the particular database connection returns to being available after the first particular database command is sent on the particular database connection and executed by a database instance.

24. The non-transitory computer-readable storage medium of claim 22, wherein the database is a test database, and wherein the captured workload data was captured when commands were previously submitted for execution against a production database.

25. A method comprising:

receiving a particular command for replay after a replay database reaches a first state, wherein the command was originally executed to advance a production database from a second state;

while a number of available connections to the replay database do not satisfy a threshold and while the replay database is before the second state, preventing the particular command from using the available connections; and in response to determining either that the number of available connections satisfies the threshold or that the replay database has reached the second state, causing execution of the particular command without preventing the particular command from using the available connections;

wherein the method is performed by one or more computing devices.

26. The method of claim 25, further comprising, while the number of available connections do not satisfy the threshold and while the replay database is before the second state, using one or more of the available connections to execute one or more commands that were originally executed to advance a production database from one or more states before the second state.

27. The method of claim 25, wherein the first state is indicated by a wait-for-System Change Number (SCN) received in association with the particular command, and wherein the second state is indicated by a commit SCN received in association with the particular command.

28. The method of claim 25, wherein the available connections are in a first set of connections that is managed by a first dispatcher, wherein the particular command is received by the first dispatcher, and wherein the replay database advances from the first state to the second state as a result of a second dispatcher causing execution of a database command using a database connection of a second set of database connections that is managed by the second dispatcher.

29. A non-transitory computer-readable storage medium storing one or more sequences of instructions which, when executed by one or more processors, cause:

receiving a particular command for replay after a replay database reaches a first state, wherein the command was originally executed to advance a production database from a second state;

while a number of available connections to the replay database do not satisfy a threshold and while the replay database is before the second state, preventing the particular command from using the available connections; and in response to determining either that the number of available connections satisfies the threshold or that the replay database has reached the second state, causing execution of the particular command without preventing the particular command from using the available connections.

30. The non-transitory computer-readable storage medium of claim 29, wherein the one or more sequences of instructions, when executed by one or more processors, further cause, while the number of available connections do not satisfy the threshold and while the replay database is before the second state, using one or more of the available connections to execute one or more commands that were originally executed to advance a production database from one or more states before the second state.

31. The non-transitory computer-readable storage medium of claim 29, wherein the first state is indicated by a wait-for-System Change Number (SCN) received in association with the particular command, and wherein the second state is indicated by a commit SCN received in association with the particular command.

32. The non-transitory computer-readable storage medium of claim 29, wherein the available connections are in a first set of connections that is managed by a first dispatcher, wherein the particular command is received by the first dispatcher, and wherein the replay database advances from the first state to the second state as a result of a second dispatcher causing execution of a database command using a database connection of a second set of database connections that is managed by the second dispatcher.

* * * * *

UNITED STATES PATENT AND TRADEMARK OFFICE
CERTIFICATE OF CORRECTION

PATENT NO. : 8,438,144 B2
APPLICATION NO. : 12/870736
DATED : May 7, 2013
INVENTOR(S) : Colle et al.

Page 1 of 1

It is certified that error appears in the above-identified patent and that said Letters Patent is hereby corrected as shown below:

In the Specification

In column 1, line 29, delete "Tranactional" and insert -- Transactional --, therefor.

In column 1, line 33, delete "Synnronization" and insert -- Synchronization --, therefor.

Signed and Sealed this
Third Day of September, 2013

Teresa Stanek Rea
*Acting Director of the United States Patent and Trademark Office*